US006192384B1

United States Patent
Dally et al.

(10) Patent No.: US 6,192,384 B1
(45) Date of Patent: Feb. 20, 2001

(54) SYSTEM AND METHOD FOR PERFORMING COMPOUND VECTOR OPERATIONS

(75) Inventors: William J. Dally, Stanford; Scott Whitney Rixner, Mountain View, both of CA (US); Jeffrey P. Grossman; Christopher James Buehler, both of Cambridge, MA (US)

(73) Assignees: The Board of Trustees of the Leland Stanford Junior University, Stanford, CA (US); The Massachusetts Institute of Technology, Cambridge, MA (US)

( * ) Notice: Under 35 U.S.C. 154(b), the term of this patent shall be extended for 0 days.

(21) Appl. No.: 09/152,763

(22) Filed: Sep. 14, 1998

(51) Int. Cl.[7] ........................................ G06F 9/28

(52) U.S. Cl. .......................... 708/200; 712/1; 712/10; 712/16; 712/20; 712/21; 708/3

(58) Field of Search ..................... 710/131–132; 711/147; 712/22, 21, 16, 10; 708/3, 200

(56) References Cited

U.S. PATENT DOCUMENTS

| | | | |
|---|---|---|---|
| 4,807,183 | * 2/1989 | Kung et al. | 710/132 |
| 5,327,548 | * 7/1994 | Hardell, Jr. et al. | 711/147 |
| 5,522,083 | * 5/1996 | Gove et al. | 712/22 |
| 5,692,139 | * 11/1997 | Slavenburg et al. | 710/131 |

OTHER PUBLICATIONS

Rixner et al., "A bandwidth–efficient architrecture for media processor." Proceedings on Annual ACM/IEEE International Symposium on Microarchitecure, p. 3–13, Nov., 1998.*

Borkar, et al. "iWarp: an integrated solution to high–speed parallel computing." Proceedings on Supercomputing, p. 330–339, Nov., 1988.*

* cited by examiner

Primary Examiner—Meng-Ai T. An
Assistant Examiner—Wen-Tai Lin
(74) Attorney, Agent, or Firm—Pillsbury Madison & Sutro, LLP

(57) ABSTRACT

A processor particularly useful in multimedia applications such as image processing is based on a stream programming model and has a tiered storage architecture to minimize global bandwidth requirements. The processor has a stream register file through which the processor's functional units transfer streams to execute processor operations. Load and store instructions transfer streams between the stream register file and a stream memory; send and receive instructions transfer streams between stream register files of different processors; and operate instructions pass streams between the stream register file and computational kernels. Each of the computational kernels is capable of performing compound vector operations. A compound vector operation performs a sequence of arithmetic operations on data read from the stream register file, i.e., a global storage resource, and generates a result that is written back to the stream register file. Each function or compound vector operation is specified by an instruction sequence that specifies the arithmetic operations and data movements that are performed each cycle to carry out the compound operation. This sequence can, for example, be specified using microcode.

29 Claims, 5 Drawing Sheets

| Load | Stream | Address Descriptor |
|---|---|---|

FIG. 4A

| Store | Stream | Address Descriptor |
|---|---|---|

FIG. 4B

| Send | Stream | Routing Header | Channel |
|---|---|---|---|

FIG. 4C

| Receive | Stream | Channel |
|---|---|---|

FIG. 4D

| Operate | Kernel | Stream Src1 | ... | Stream Src4 | ... | Stream Dst1 | ... | Stream Dst4 |
|---|---|---|---|---|---|---|---|---|

FIG. 4E

SYSTEM AND METHOD FOR PERFORMING COMPOUND VECTOR OPERATIONS

This invention was made in conjunction with U.S. Government support under U.S. Army Grant No. DABT63-96-C-0037.

BACKGROUND OF THE INVENTION

1. Field of the Invention

The present invention is directed to computer architectures. More specifically, the invention is directed to pipelined and parallel processing computer systems which are designed to efficiently handle continuous streams of instructions and data.

2. Description of Related Art

Providing adequate instruction and data bandwidth is a key problem in modern computer systems. In a conventional scalar architecture, each arithmetic operation, e.g., an addition or multiplication, requires one word of instruction bandwidth to control the operation and three words of data bandwidth to provide the input data and to consume the result (two words for the operands and one word for the result). Thus, the raw bandwidth demand is four words per operation. Conventional architectures use a storage hierarchy consisting of register files and cache memories to provide much of this bandwidth; however, since arithmetic bandwidth scales with advances in technology, providing this instruction and data bandwidth at each level of the memory hierarchy, particularly the bottom, is a challenging problem.

Vector architectures have emerged as one approach to reducing the instruction bandwidth required for a computation. With convention vector architectures, e.g., the Cray-1, a single instruction word specifies a sequence of arithmetic operations, one on each element of a vector of inputs. For example, a vector addition instruction VADD VA, VB, VC causes each element of an, e.g., sixty-four element vector VA to be added to the corresponding element of a vector VB with the result being placed in the corresponding element of vector VC. Thus, to the extent that the computation being performed can be expressed in terms of vector operations, a vector architecture reduces the required instruction bandwidth by a factor of the vector length (sixty-four in the case of the Cray-1).

While vector architectures may alleviate some of the instruction bandwidth requirements, data bandwidth demands remain undiminished. Each arithmetic operation still requires three words of data bandwidth from a global storage source shared by all arithmetic units. In most vector architectures, this global storage resource is the vector register file. As the number of arithmetic units is increased, this register file becomes a bottleneck that limits further improvements in machine performance.

To reduce the latency of arithmetic operations, some vector architectures perform "chaining" of arithmetic operations. For example, consider performing the above vector addition operation and then performing the vector multiplication operation VMUL VC VD VE using the result. With chaining, the vector multiply instruction consumes the elements computed by the vector add instruction in VC as they are produced and without waiting for the entire vector add instruction to complete. Chaining, however, also does not diminish the demand for data bandwidth—each arithmetic operation still requires three words of bandwidth from the vector register file.

BRIEF SUMMARY OF THE INVENTION

In view of the above problems of the prior art, it is an object of the present invention to provide a data processing system and method which can provide a high level of performance without a correspondingly high memory bandwidth requirement.

It is another object of the present invention to provide a data processing system and method which can reduce global storage resource bandwidth requirements relative to a conventional scalar or vector processor.

It is a further object of the present invention to provide a parallel processing system and method which minimizes the number of external access operations each processor conducts.

It is yet another object of the present invention to provide a parallel processing system and method which utilizes granular levels of operation of a higher order than individual arithmetic operations.

It is still another object of the present invention to provide a parallel processing system and method which is capable of simultaneously exploiting multiple levels of parallelism within a computing process.

It is yet a further object of the present invention to provide a single-chip processing system which reduces the number of off-chip memory accesses.

The above objects are achieved according to a first aspect of the present invention by providing a processor having a tiered storage architecture to minimize global bandwidth requirements. The processor has a stream register file through which the processor's arithmetic units transfer streams to execute processor operations. Load and store instructions transfer streams between the stream register file and a stream memory; send and receive instructions transfer streams between stream register files of different processors; and operate instructions pass streams between the stream register file and computational kernels.

Each of the computational kernels is capable of performing compound vector operations. A compound vector operation performs a sequence of arithmetic operations on data read from the stream register file, i.e., a global storage resource, and generates a result that is written back to the stream register file. Each function or compound vector operation is specified by an instruction sequence that specifies the arithmetic operations and data movements that are performed each cycle to carry out the compound operation. This sequence can, for example, be specified using microcode.

Because intermediate results are forwarded directly between arithmetic units and not loaded from or stored to the stream register file, bandwidth demands on the stream register file are greatly reduced and global storage bandwidth requirements are minimized.

For example, consider the problem of performing a transformation on a sequence of points, a key operation in many graphics systems when, e.g., adjusting for perspective or moving from a model space to a world space. In its most basic form, the operation requires reading three words of data for each point (x, y, z), performing a 4×4 vector-matrix multiply, taking the reciprocal of a number, performing three multiplies, and writing the resulting point (x', y', z') in the new coordinate system. Without optimizations, the perspective transformation requires thirty-two arithmetic operations for each point—nineteen multiplications, twelve additions and one reciprocal operation. On conventional vector architectures, this would require ninety-six words of vector register bandwidth per point.

In contrast, a compound vector architecture as described in greater detail below can perform the perspective transformation in a single operation. The compound vector operation requires only six words of global bandwidth storage per point: three words to read the coordinates of the original point (x, y, z) and three words to write the coordinates of the transformed point (x', y', z'). All of the intermediate results are forwarded directly between arithmetic units and thus do not require global storage bandwidth. This sixteen-fold reduction in vector register bandwidth greatly improves the scalability of the architecture. In effect, the compound vector architecture moves the vector register file access outside of a function such as perspective transformation.

BRIEF DESCRIPTION OF THE DRAWINGS

The above and other objects of the present invention will become readily apparent when reading the following detailed description taken in conjunction with the appended drawings in which:

FIGS. 4A–4E show the structure of the instruction set of the graphics processor.

DETAILED DESCRIPTION OF PRESENTLY PREFERRED EMBODIMENTS

First, the overall architecture of an exemplary computer system employing a preferred embodiment of the present invention will be described.

Central to the operation of this preferred embodiment are the concepts of streams and kernels. A stream is a sequence of elements made up of a collection of related data words. A stream may be received by a computation kernel which executes the same operation on all of the elements in the stream to produce another stream that can be output or sent to other kernels for further processing.

Kernels are relatively small computational units that may only access local variables, read input streams and write to output streams. They cannot make arbitrary memory references. In a preferred embodiment of the invention, the computation kernels are expressed in a C-like programming language and compiled into microcode programs that sequence the operation of arithmetic clusters to carry out compound stream operations on each element in a stream. The operations implemented by the kernels are called compound operations because in contrast to conventional vector or stream operations which perform only one operation on each vector element, each kernel performs multiple arithmetic operations on each stream element. A compound stream operation is a small program that has access to the record at the head of each of its input streams and to its local variables. The kernel reads the input streams and writes to the output streams using explicit instructions. The length and record size of each stream can be different and the number of input and output streams need not be the same.

Figure 1:
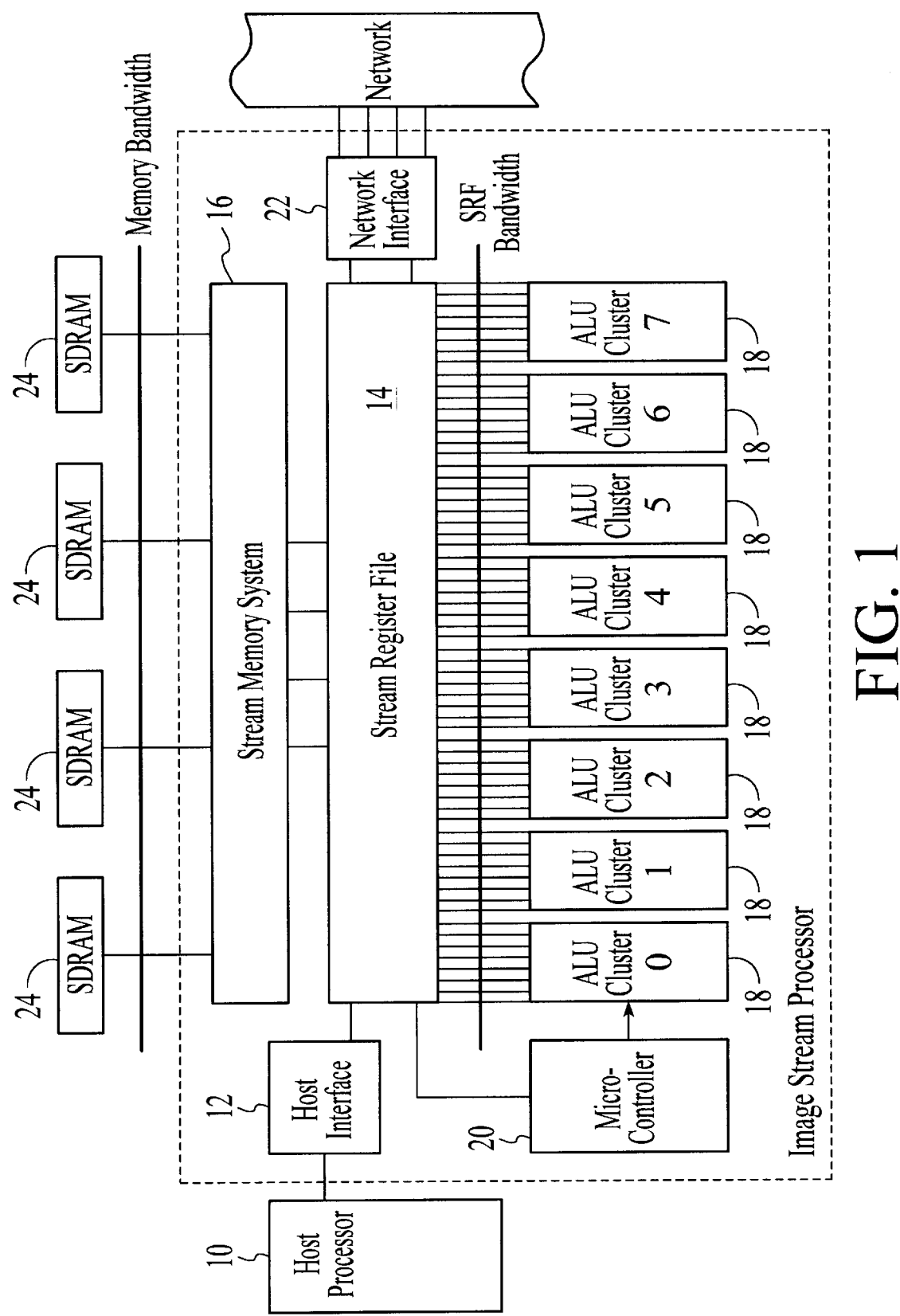
FIG. 1 is a block diagram of a graphics processor according to a preferred embodiment of the invention.

With this foundation in mind, FIG. 1 shows a preferred embodiment of the present invention used in a high speed graphics coprocessor. Here, a host processor 10 provides data to the graphics coprocessor via a host interface 12. The data from the host processor 10 is stored in a stream register file 14 which is the center of activity in the graphics coprocessor. The host interface 12, stream memory 16, arithmetic clusters 18, microcontroller 20 and network interface 22 all interact by transferring streams of data and instructions to and from the stream register file 14.

Figure 2:
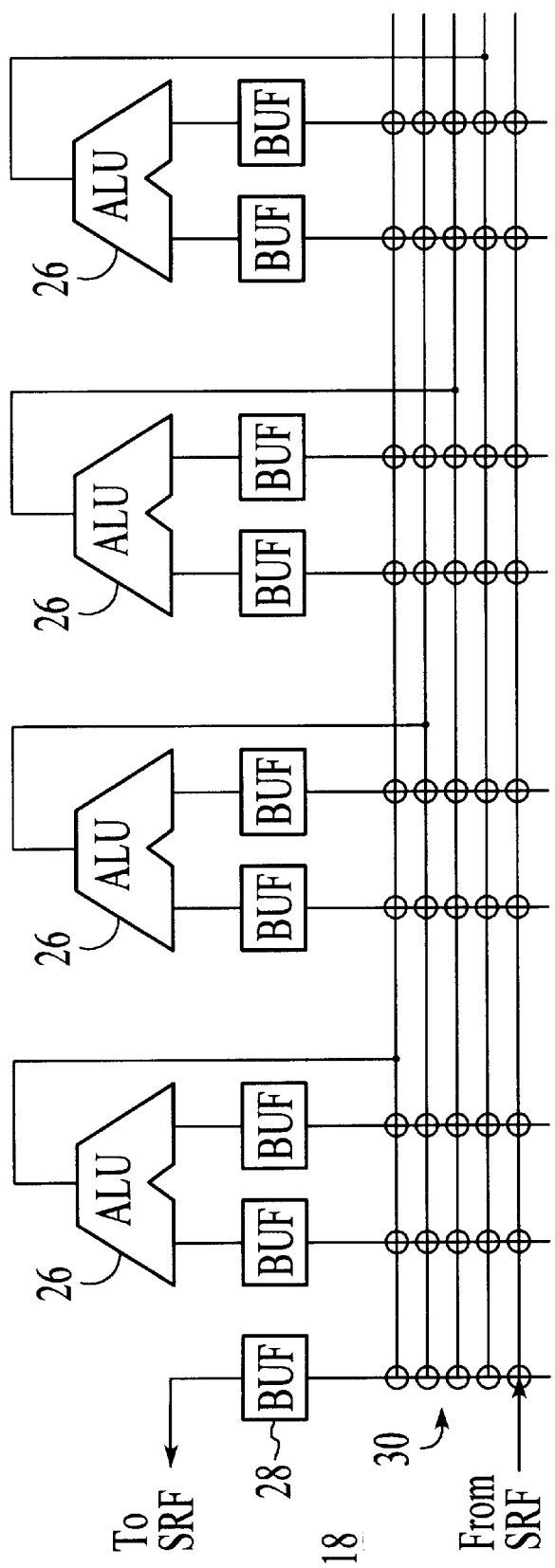
FIG. 2 is a diagram of an arithmetic cluster used in the graphics processor.

The system has a three-level storage hierarchy consisting of the stream memory 16 as a global storage unit, the stream register file 14 as an intermediate storage unit, and local register files 28 (see FIG. 2) in the arithmetic clusters 18 as local storage units. The stream memory 16 holds persistent data; the stream register file 14 stores streams as they are passed to, from and between computation kernels, and the arithmetic clusters 18 use the local register files to store intermediate results produced during computations within the cluster so they do not need to recirculate through the stream register file 14.

The stream register file 14 is preferably a 64 kB memory organized to handle streams of data and instructions (of course, the size of the stream register file may be varied according to the application). An array of eighteen 64 word stream buffers are used to allow read/write access to eighteen streams simultaneously. The internal memory array is thirty-two 32-bit words (i.e., 1024 bits) wide so that it can fill or empty half a stream buffer each cycle. Each stream client may access its dedicated stream buffer every cycle if there is data available to be read or space available to be written. The clients of eight of the stream buffers are the eight clusters 18, and these stream buffers are accessed eight words at a time. The remaining ten stream buffers are accessed a single word at a time.

The stream memory system 16 can perform two simultaneous memory transfers between four thirty-two bit wide SDRAM banks 24 and the stream register file 14 via four stream buffers (two for data and two for indices) in the stream register file 14.

The eight arithmetic clusters 18 connected to the stream register file 14 are controlled by the microcontroller 20. Each cluster 18 operates on one record of a stream so that eight records can be processed simultaneously. An exemplary internal structure of an arithmetic cluster, shown in FIG. 2, includes four functional elements 26 each buffered by one of the local register files 28 which stores kernel constants, parameters and local variables, thereby reducing the bandwidth load on the stream register file 14.

The local register files 28 themselves are fed by a crosspoint switch 30 which distributes outputs of the functional elements 26 to inputs thereof as intermediate data for use in subsequent arithmetic operations. The output of each functional element 26 is connected to one of the input lines of the crosspoint switch 30, and the input of each local register file 28 is fed by a corresponding output line of the crosspoint switch 30. Additionally, one of the crosspoint input lines is fed by the stream register file 16 to provide the contents of the stream dedicated to that cluster, and one of the crosspoint output lines is returned to the stream register file 16 for writing into that stream.

Figure 3:
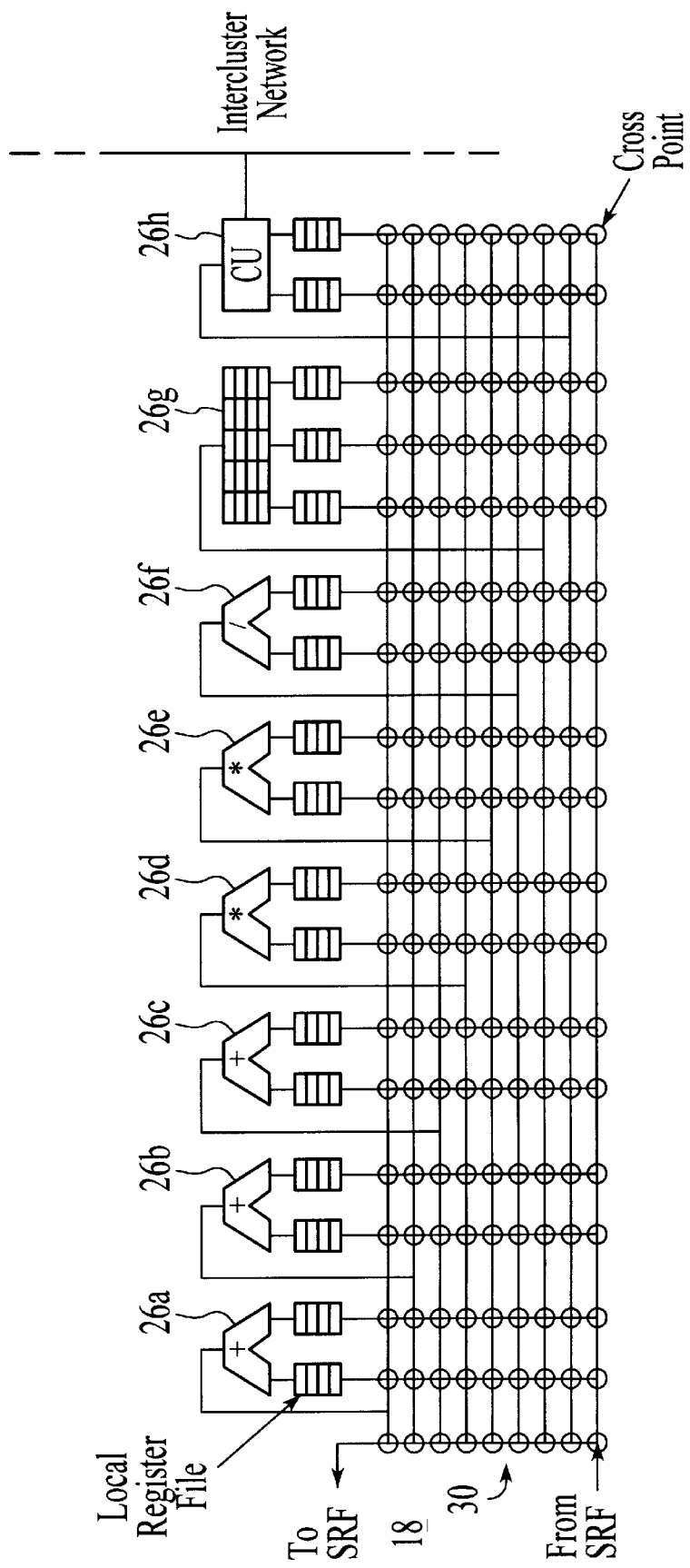
FIG. 3 is a diagram of an arithmetic cluster having variegated functional elements.

A specific implementation of the arithmetic cluster 18 structure is shown in FIG. 3 in which three adders 26a–26c, two multipliers 26d and 26e, a divider/square root unit 26f, a 128 entry scratchpad register file 26g, and an inter-cluster communication unit 26h (hereinafter collectively referred to as functional elements 26) are employed as functional elements 26.

The scratch pad register file 26g can be indexed with a base address specified in an instruction word and an offset specified in a local register and may be used for coefficient storage, short arrays, small lookup tables and some local register spilling. The adders 26a–26c and multipliers 26d and 26e have latencies of four and five cycles, respectively, are fully pipelined and perform single precision floating point arithmetic, 32-bit integer arithmetic, and 8-bit or 16-bit parallel subword integer operations. The adders 26a–26c also are able to perform 32-bit integer and parallel subword integer shift operations. The divider/square root unit 26f is not pipelined and operates only on single precision floating point and 32-bit integers.

Finally, the intercluster communication unit 26h performs data transfer among clusters using arbitrary communication patterns. This is particularly useful in applications such as Fast Fourier Transforms where interaction is required between adjacent stream elements.

The microcontroller 20 receives kernels as compiled VLIW microcode programs from the host processor 10. The microcontroller 20 executes each of the kernels as an independent process using the arithmetic clusters 18 for performing computational operations.

The network interface 22 connects the stream register file 14 to four bidirectional links that can be used to connect the graphics processor to other like processors.

Preferably, a substantial portion of the graphics coprocessor, particularly including the stream register file 14, arithmetic clusters 18 and microcontroller 20, are implemented on a single chip using VLSI techniques. This is particularly advantageous because it allows accesses within the arithmetic clusters 18 and accesses to the stream register file 14 to be internalized, thus freeing up more of the pin bandwidth to be used for communication with the stream memories 24. In fact, it appears that a coprocessor as disclosed herein can be implemented on a 1 cm$^2$ 0.25 $\mu$m CMOS chip operating at 400 MHz and perform up to 16 billion operations per second.

The application-level instruction set used by the host processor 10 to program the graphics coprocessor is shown in FIGS. 4A–4E. The set consists of two complementary Load and Store instructions which are used to move streams between the stream register file 14 and the stream memory 16. As shown in FIGS. 4A and 4B, each instruction consists of an instruction descriptor which identifies a starting location, the stream to be loaded into the stream register file 14 or stored in the stream memory 16, and an address descriptor which specifies the record size, base address in memory and addressing mode, e.g., constant stride, indexed or bit-reversed. Optionally, the length of a stream in the stream register file 14 may be included.

FIGS. 4C and 4D show send and receive instructions which allow streams to be passed from the stream register file of one graphics coprocessor to that of another. These instructions are particularly advantageous because they allow multiple processors to operate in cooperation and provide extensibility and scalability. The Send instruction shown in FIG. 4C includes the stream to be sent, a routing header identifying the external coprocessor to which the stream is sent, and a channel indicator designating the communications channel used so that a single node can discriminate between arriving messages. Similarly, the Receive instruction of FIG. 4D includes the stream to be received and a channel indicator designating the communications channel for node discrimination of multiple messages.

Finally, the Operate instruction invokes a kernel to perform its compound stream operation on one or more input streams to generate one or more output streams. The instruction includes a kernel field designating the kernel to be activated, up to four input stream designators which identify streams to be used to provide input data to the kernel's compound stream operation, and up to four output stream designators which identify streams to which results of the compound stream operations are provided.

The host processor 10 issues these application-level instructions to the coprocessor with encoded dependency information which specifies the system resources and data needed to execute the instructions. The host interface 12 buffers these instructions and, when their requirements are satisfied, issues them to the coprocessor. The host interface 12 also maps the coprocessor to the host's address space so that the host can read and write to the stream memory 16 and execute programs that issue the appropriate application-level instructions to the coprocessor.

Using this architecture, substantial improvements in memory bandwidth use minimization can be realized. Consider, for example, the point transformation example given in the Summary of the Invention section above. The above structure may be used to perform the operations necessary to carry out the transformation as show in TABLE I below.

TABLE I

| Cycle | From SRF 14 | To SRF 14 | ALU Cluster 18a | ALU Cluster 18b | ALU Cluster 18c | ALU Cluster 18d |
|---|---|---|---|---|---|---|
| 1 | x | | | | | |
| 2 | y | | $x_1 = a_{11}x$ | $x_2 = a_{12}x$ | $x_3 = a_{13}x$ | $x_4 = a_{14}x$ |
| 3 | z | | $y_1 = a_{21}y$ | $y_2 = a_{22}y$ | $y_3 = a_{23}y$ | $y_4 = a_{24}y$ |
| 4 | | | $z_1 = a_{31}z$ | $z_2 = a_{33}z$ | $z_3 = a_{33}z$ | $z_4 = a_{34}z$ |
| 5 | | | $t_1 = x_1 + y1$ | $t_2 = x_2 + y_2$ | $t_3 = x_3 + y_3$ | $t_4 = x_4 + y_4$ |
| 6 | | | $u_1 = z_1 + a_{41}$ | $u_2 = z_2 + a_{42}$ | $u_3 = z_3 + a_{43}$ | $u_4 = z_4 + a_{44}$ |
| 7 | | | $x_p = t_1 + u_1$ | $y_p = t_2 + u_2$ | $z_p = t_3 + u_3$ | $w = t_4 + u_4$ |
| 8 | | | | | | $w_i = 1/w$ |
| 9 | | | $x' = x_p{}^*w_i$ | $y' = y_p{}^*w_i$ | $z' = z_p{}^*w_i$ | |
| 10 | | x' | | | | |
| 11 | | y' | | | | |
| 12 | | z' | | | | |

In the first operation cycle, the x-coordinate of the point is loaded from the register file 14. In the next operation cycle, the y-coordinate is loaded and the x-coordinate is multiplied by appropriate elements in the transformation matrix. Similarly, in the following operation cycle, the z-coordinate is loaded and the y-coordinate is multiplied by the appropriate matrix elements, and so on. During the computations, the program parameters such as the transformation matrix entries and intermediate results are stored in the local register files associated with the functional elements 26 which will consume them. Also, various values are distributed over the crossbar switch 30. For example, at the end of cycle 8 $w_i$, the reciprocal of w, is distributed to three of the arithmetic clusters 18 to be used in calculating x', y' and z'.

In this way, four arithmetic clusters 18 can calculate the point transformation in just twelve operational cycles, a great improvement over conventional architectures. In practice, further optimizations would be performed to eliminate blank spots in the table at the beginning and end of the sequence using, e.g., loop unrolling or software pipelining. Also, in an actual implementation the functional elements 26 will have latencies of several cycles, e.g., two cycles for the adders 26a–26c, four cycles for the multipliers 26d and 26e, and eight cycles for the divider 26f, and the operation schedule would need to be rolled out to account for arithmetic latency. The resulting spaces can also be filled using unrolling.

Figure 5:
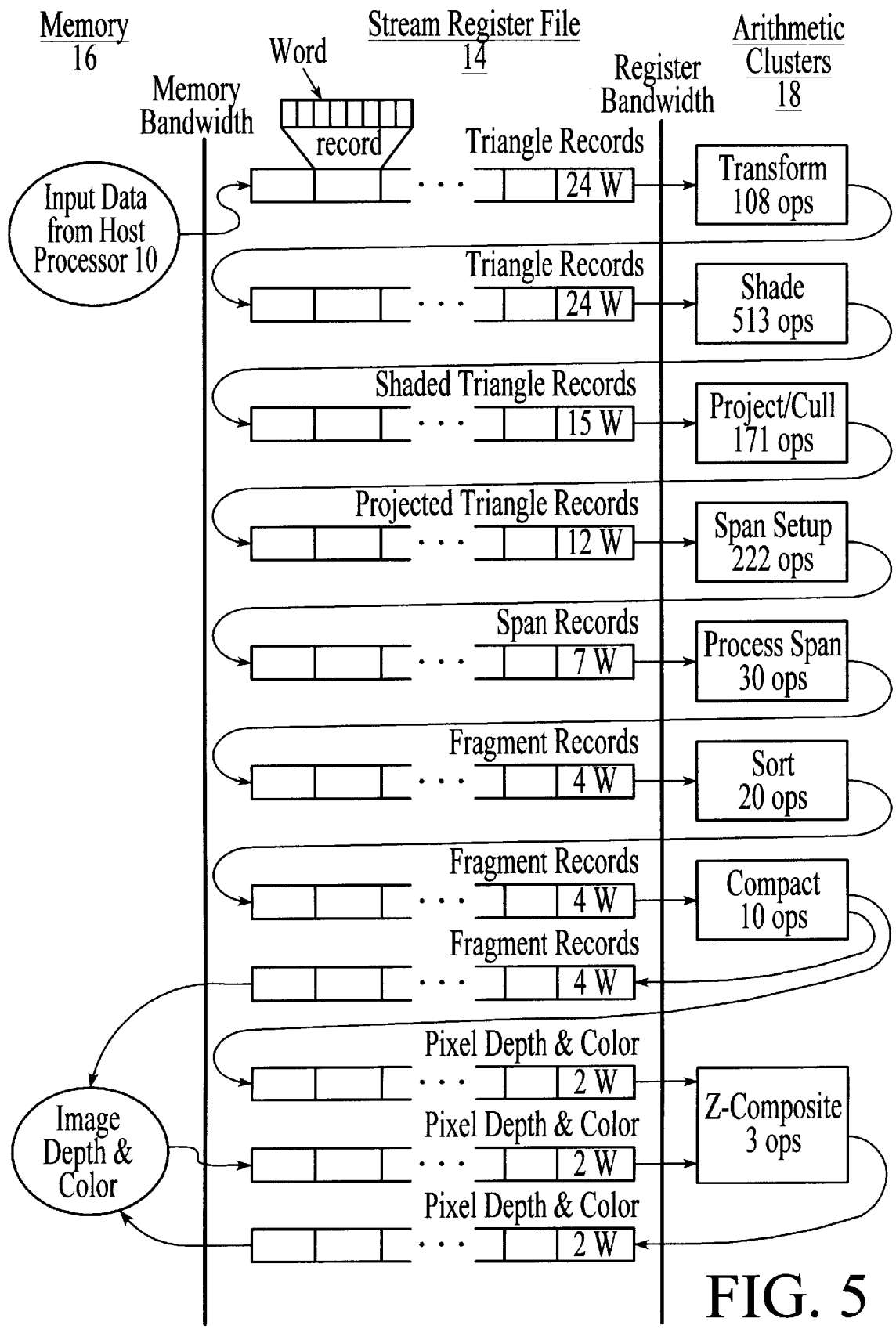
FIG. 5 depicts the flow of data between kernels in the graphics processor when performing a triangle rendering operation.

Consider, as another example, triangle rendering—a common procedure in graphics processing which is exemplified by the C++ code below and whose dataflow is shown in FIG. 5:

```
void render_triangle_stream() {
    // Make sure kernels loaded into coprocessor µcontroller
    int transform = load_microcode ("transform.uc");
    int shade = load_microcode("shade.uc");
    int proj _cull = load_microcode("proj_cull.uc");
    int span_setup = load_microcode("span_setup.uc");
    int process_span = load_microcode("process_span.uc");
    int sort = load_microcode("sort.uc");
    int comp = load_microcode("comp.uc");
    int z_composite = load_microcode("z_composite.uc");
    // Triangle rendering on series of triangle streams
    for (int ii = 0; ii<NUM_TRIANGLE_STREAMS; I++) {
        stream_load(mem_model_tri, srf_model_tri);
        stream_op(transform, srf_model_tri, srt_world_tri);
        stream_op(shade, srf_world_tri, srf_shaded_tri);
        stream_op(proj_cull, srf_shaded_tri, srf_screen_tri);
        stream_op(span_setup, srf_screen_tri, srf_spans);
        stream_op(process_span, srf_spans, srf_fragments);
        stream_op(sort, srf_fragments, srf_sort_fr);
        stream_op(comp, srf_sort_fr, srf_buf_idx, srf_pix);
        stream_load(mem_buf_pix[srf_buf_idx], srf_pix2);
        stream_op(z_comp, srf_pix, srf_pix2, srt_out_pix);
        stream_store(srf_out_pix, mem_buf_pix[srf_buf_idx]);
        update_descriptors();
    }
}
```

Here, each library function has a one-to-one correspondence with an application-level instruction. The load_microcode function loads the microcode routine denoted by its argument and returns the starting address of the code. Memory load and store instructions are respectively issued to the coprocessor by the stream_load and stream_store functions. Finally, an Operate instruction is issued by the stream_op function to cause the corresponding microcode kernel to run on each element of the specified source streams. For example, the first stream_op function shown in the code initiates a compound stream operation on the coprocessor by issuing an Operate instruction specifying the start address of the transform microcode. The instruction also specifies one input stream, srf_model_tri, and one output stream, srt_world_tri.

The arguments of the stream load, store and operate instructions are specified by stream descriptors. Each memory stream descriptor, e.g., mem_model_tri, includes a base address, length, record length, mode and stride or index stream. Each register stream descriptor, e.g., srf_model_tri, includes a base location in the stream register file 16, record length, and stream length. These descriptors are produced by C++ code running on the host processor.

As shown in FIG. 5, the first arithmetic step in the process is to transform the triangle from model space to world space—a slightly more complicated version of the simple transform described in the summary section above. For this transformation, there is a single input stream and a single output stream. Each stream consists of twenty-four elements—for each of the three triangle vertices, the three dimensional vertex coordinates; a perspective coordinate; the vertex color; and a normal vector for the vertex expressed as a three dimensional coordinate. With this stream structure, the transformation computation can be expressed as the single compound stream operation shown in pseudocode below:

```
loop over all triangles {
    loop over three vertices {
        // read vertex data from input stream
        [x, y, z, w, color, nx, ny, nz] = input_stream0;
        // compute transformed vertex coordinates
        tx = r11 * x + r12 * y + r13 * z + r14 * w;
        ty = r21 * x + r22 * y + r23 * z + r24 * w;
        tz = r31 * x + r32 * y + r33 * z + r34 * w;
        // compute transformed normal vector
        tnx = n11 * nx + n12* ny + n13 * nz;
        tny = n21 * nx + n22* ny + n23 * nz;
        tnz = n31 * nx + n32* ny + n33 * nz;
    // write vertex data to output stream
    output_stream0 = [tx, ty, tz, w, color, tnx, tny, tnz];
    }
}
```

Now, a typical data set might consist of average triangles covering twenty-five pixels with a depth complexity of 5. Rendering each triangle might require 1929 arithmetic operations, 666 references to stream register file 16 and 44 references to stream memory 18. With a conventional architecture in which three memory references are required for each arithmetic operation (one for reading the arithmetic instruction, one for reading the operands and one for writing the result), at least 5787 references would be necessary. Thus, by capturing locality within the kernels, coding the triangle rendering application to take advantage of the above-described architecture, references to memory outside the kernels are reduced by a factor of more than 8.

Moreover, once the kernels are programmed by microcode from the host processor 10, the entire triangle rendering process shown in FIG. 5 can be performed with only eleven application-level instructions: a Load instruction reads the triangle stream from the stream memory 16; seven Operate instructions sequence the kernels from transform to compact; a Load instruction uses the index vector computed by compact to read the old Z-values of the pixels in question; an Operate instruction performs Z-compositing; and a Store instruction writes the visible pixels and their Z-values back to the stream memory 16.

Additional efficiency could be realized by using more than one coprocessor in a multiprocessing arrangement. For example, when performing the triangle rendering process described above, one coprocessor could be used to run the first three kernels and transmit the result to a second coprocessor to run the remaining five kernels simply by inserting a Send and complementary Receive instruction at the appropriate position in the sequence of application-level instructions. The remaining resources of the two coprocessors may be used to render other triangles or to execute unrelated processes.

Kernels such as the transformation kernel listed above are written in a C-like microassembly language, and the kernel compiler (preferably on the host processor 10) takes this C-like code and generates VLIW microcode instructions that enable the microcontroller 20 to control the functional elements 26a–26h. The only flow control operations permitted in the kernels are iterative loops (although some control operations such as conditional branching may preferably be implemented in alternative ways as described in the U.S. patent application to William Dally, Scott Rixner, J. P. Grossman, and Chris Buehler, filed concurrently herewith and entitled SYSTEM AND METHOD FOR PERFORMING COMPOUND VECTOR OPERATIONS, incorporated herein by reference) and the compiler applies several common high-level optimizations such as loop unrolling, iterative copy propagation and dead code elimination. It then performs list scheduling starting with the largest, most deeply nested block, and within each block operations with the least slack are scheduled first.

The stream memory 16, stream register file 14 and local register files 28 have bandwidth ratios of 1:32:272. That is, for each word read from memory, thirty-two words may be accessed from the stream register file 14 and 272 words may be read from or written to the local register files 28 in the functional elements 26a–26h. In other words, the coprocessor can perform 40.5 arithmetic operations per four byte word of memory bandwidth and 1.2 arithmetic operations per word of stream register file bandwidth. The bandwidths of the stream memory 16 and stream register file 14 are limited by chip pin bandwidth and by available global chip wiring, respectively, while the bandwidth of the local register files 28 is set by the number of functional elements 26a–26h.

TABLE II compares the memory, global register and local register bandwidth requirements of the stream architecture of the coprocessor with a prior art vector processor and a prior art scalar processor for the above-described triangle transformation kernel. The figures for the scalar architecture were generated by compiling the transformation kernel for an UltraSPARC II using version 2.7.2 of the gcc compiler.

TABLE II

| References | Stream | Scalar | | Vector | |
|---|---|---|---|---|---|
| Memory | 5.5 | 342 | (62.2) | 48 | (8.7) |
| Global Register File | 48 | 1030 | (21.5) | 261 | (5.4) |
| Local Register File | 355 | N/A | | N/A | |

The entries for the scalar and vector processors should be self-explanatory. For the stream architecture, the 5.5 stream memory access figure was obtained by averaging the 44 memory references for the entire pipeline over eight kernels. The global register file reference figure is based on the 24 words read from the stream register file 14 and the 24 words written to the stream register file 14. Finally, the kernel executes 108 arithmetic operations which use 355 words of data from local register file 28. As can be seen from TABLE II, the memory bandwidth requirements of the scalar processor are 62.2 times higher than that of the stream architecture and the global register bandwidth requirements of the scalar processor are 21.5 times higher than that of the stream processor. The memory bandwidth requirements of the vector processor are 8.7 times that of the stream processor, and the global register bandwidth requirements of the vector processor are 5.4 times that of the stream processor.

Three image processing kernels, FFT, triangle transform and blockwarp (taken from an image-based rendering application), were used to generate the performance results shown in TABLE III below. FFT performs one stage of an N-point Fast Fourier Transform; triangle transform is the triangle vertex transformation described above; and Blockwarp performs a 3-D perspective transformation on 8×8 blocks of 3-D pixels to warp them from model space into screen space. As can be seen from the Table, the mean speed increase when moving from execution of each kernel on a single cluster to execution on eight clusters is over 7.5.

TABLE III

| Kernel | Single Cluster | Eight Clusters | Speedup |
|---|---|---|---|
| FFT (cycles/butterfly) | 4.19 | 0.75 | 5.59 |
| Transform (cycles/triangle) | 177 | 22.13 | 8 |
| Blockwarp (cycles/block) | 2890 | 275 | 10.5 |
| Harmonic Mean | | | 7.52 |

The vertex transformations are independent of one another, so there is no overhead lost to communication between clusters when executing that kernel, and the net speedup is exactly 8. The FFT requires exchanges of data between kernels, so the speedup when executing that kernel is somewhat less than 8. Execution of the Blockwarp kernel on eight clusters eliminates a loop in the process, resulting in a speedup of more than 8.

TABLE IV shows the bandwidth used by each of the above kernels at each level of the memory hierarchy. The kernels require an average of 9.4 times as much local register bandwidth as stream register bandwidth. The throughput in the blockwarp kernel is worse than in the other kernels because it performs a divide when computing each pixel. The non-pipelined divider creates a bottleneck because all subsequent calculations are dependent on the divide result. Fully one-third of the execution cycles are spent waiting for results from the divider without issuing any arithmetic operations, even with loop unrolling to hide the latency to dependent calculations.

TABLE IV

| Kernel | Stream Register File (GB/s) | Local Register File (GB/s) | Operations per Cycle | Arithmetic Op'ns (GOPS) |
|---|---|---|---|---|
| FFT | 21.45 | 165.66 | 18.76 | 7.51 |
| Transform | 10.41 | 77.02 | 14.64 | 5.86 |
| Blockwarp | 4.19 | 46.59 | 8.73 | 3.49 |
| Harmonic Mean | 7.87 | 74.10 | 12.70 | 5.08 |

Thus, a processing system according to the present invention exposes the parallelism and locality of data processing tasks such as image processing and the like in a manner than is well-suited to current technologies. A programmer may describe an application as streams of records passed through computation kernels, and individual stream elements may be operated on in parallel by the arithmetic units acting under the control of the microcontroller as computational means to exploit data parallelism. Instruction parallelism may be exploited within the individual computation kernels by the microcontroller acting as program executing means. Finally, control parallelism may be exploited by partitioning an application across multiple processing systems by the host processor acting as control means. Locality is exposed both by recirculating streams through a stream register file and also within the computation kernels which access streams in order and keep a small set of local variables. Moreover, the combined effect of exploiting parallelism on each level is multiplicative. This enables the system architecture to make efficient use of a large number of arithmetic units without global bandwidth becoming a bottleneck.

As will be apparent from reading the above explanation, exploiting parallelism as used above and in the appended claims means performing computations, program execution or process control to take advantage of redundancy of content and similarity of structure in data, programs or processes flow to realize operational efficiencies in comparison with conventional architectures.

Modifications and variations of the preferred embodiment will be readily apparent to those skilled in the art. For example, the number of operative units such as arithmetic clusters, functional units within the clusters, memory banks and the like need not be as set forth herein and may readily be adapted depending on a particular application. Further, variations on the instruction set described above as well as new processor instructions may be provided. A larger number of simplified clusters may be provided, or a smaller number of more powerful clusters may be used. Such variations are within the scope of the present invention as defined by the appended claims.

What is claimed:

1. A data processing system comprising:
    a controller;
    at least one arithmetic cluster capable of independently and sequentially performing compound arithmetic operations, responsive to commands directly operatively provided from the controller, on data presented at an input thereof and providing resultant processed data at an output thereof, and capable of utilizing intermediate data generated as a result of performing the operations in subsequent operations without retrieving the intermediate data from a source external to that arithmetic cluster; and
    a stream register file directly operatively coupled to the cluster and being selectively readable and writable, responsive to commands from the controller, by each of the at least one arithmetic cluster for holding the resultant processed data of the at least one arithmetic cluster.

2. The system of claim 1, wherein at least one arithmetic cluster includes a plurality of functional elements each capable of performing an individual arithmetic operation independently of other functional elements, and capable of providing results thereof to at least one of itself and other functional elements for use in subsequent arithmetic operations.

3. The system of claim 2, wherein the plurality of functional elements are connected to a crossbar switch for providing results of arithmetic operations performed by each functional element to other functional elements.

4. The system of claim 3, wherein an arithmetic cluster includes a local storage unit for storing data to be used by a functional element within the arithmetic cluster during a compound vector operation.

5. The system of claim 4, wherein:
    the local storage unit is connected to an input of the functional element within the arithmetic cluster; and
    data stored in the local storage unit is directly accessible only by the functional element to which it is connected.

6. The system of claim 4, wherein data stored in the local storage unit is accessible by a plurality of functional elements in the arithmetic cluster containing that local storage unit and plurality of functional elements.

7. The system of claim 3, wherein the crossbar switch is a sparse crossbar switch.

8. The system of claim 2, wherein the plurality of functional elements includes a scratchpad register file.

9. The system of claim 2, wherein the plurality of functional elements includes an intercluster communication unit for communicating with other arithmetic clusters.

10. The system of claim 1, wherein an arithmetic cluster includes a local storage unit for storing data to be used by the arithmetic cluster in subsequent arithmetic operations.

11. The system of claim 1, further comprising a host processor capable of selectively reading and writing the stream register file.

12. The system of claim 11, further comprising:
    a network interface connected to the stream register file for exchanging data between the stream register file and another system.

13. The system of claim 1, wherein the at least one arithmetic cluster is a plurality of arithmetic clusters each capable of independently and sequentially performing compound arithmetic operations, responsive to commands from the controller, on data presented at respective inputs thereof and providing resultant processed data at respective outputs thereof, and capable of utilizing intermediate data generated as a result of performing the operations in subsequent operations without retrieving the intermediate data from a source external to that arithmetic cluster.

14. The system of claim 1, further comprising a global storage unit being selectively readable and writable, responsive to commands from the controller, only by the stream register file.

15. The system of claim 14, wherein the stream register file is selectively and independently writable, responsive to the controller, by at least two of the controller, the global storage unit and an arithmetic cluster.

16. The system of claim 14, wherein the global storage unit is selectively readable and writable, responsive to the controller, by the stream register file in independent, simultaneous transfers.

17. A method of processing data comprising:
    performing multiple arithmetic operations simultaneously and independently in each of a plurality of arithmetic clusters responsive to commands directly operatively provided from a controller, at least some of the arithmetic operations utilizing data generated and supplied by the arithmetic clusters without retrieving the generated data from a source external to the arithmetic clusters; and
    reading data used by the arithmetic clusters from and writing data generated by the arithmetic clusters to a stream register file connected directly to the plurality of arithmetic clusters.

18. The method of claim 17, wherein the reading and writing are performed for data generated by multiple arithmetic clusters in the plurality of arithmetic clusters independently and simultaneously.

19. The method of claim 17, wherein performing multiple arithmetic operations includes utilizing data generated and supplied by the arithmetic clusters without retrieving the generated data from a source external to an arithmetic clusters utilizing that data.

20. The method of claim 17, wherein performing multiple arithmetic operations includes performing individual arithmetic operations simultaneously and independently in each of a plurality of functional elements, at least some of the functional elements utilizing data generated and supplied by the functional elements without retrieving the data generated by the functional elements from a source external to an arithmetic cluster containing those functional elements.

21. The method of claim 17, further comprising storing at least some data generated by a functional element in a local storage unit.

22. The method of claim 21, further comprising retrieving data stored in the local storage unit only by a functional element which stored that data.

23. The method of claim 21, further comprising retrieving data stored in the local storage unit by plural functional units within an arithmetic cluster containing the plural functional elements.

24. The method of claim 17, further comprising exchanging data between arithmetic clusters.

25. The method of claim 17, further comprising exchanging data from the stream register file to an external system.

26. The method of claim 17, further comprising exchanging data between the stream register file and a global storage unit.

27. The method of claim 26, wherein exchanging data includes exchanging multiple data elements between the stream register file and the global storage unit independently and simultaneously.

28. The system of claim 1, wherein cluster instructions and at least one of data input and output streams are provided to the at least one cluster responsive to a stream instruction.

29. The system of claim 8, wherein the scratchpad register file is independently addressable for the cluster which it is in using a computed address.

* * * * *